United States Patent [19]

Kern

[11] 4,434,346
[45] Feb. 28, 1984

[54] CONTACT DETECTOR

[76] Inventor: Roger J. Kern, c/o Kern Special Tools Co., Inc., 140 Glen St., New Britain, Conn. 06051

[21] Appl. No.: 404,326

[22] Filed: Aug. 2, 1982

Related U.S. Application Data

[63] Continuation-in-part of Ser. No. 195,369, Oct. 9, 1980, abandoned.

[51] Int. Cl.$^3$ .............................................. B23P 1/02
[52] U.S. Cl. ................................ 219/69 C; 324/61 R; 324/88
[58] Field of Search ............... 219/69 S, 69 C, 69 G, 219/124.02, 124.03, 130.01; 324/61 R, 60 R, 83 R, 88, 83 FM, 83 FE

[56] References Cited

U.S. PATENT DOCUMENTS

| | | | |
|---|---|---|---|
| 3,078,415 | 2/1963 | Frelich | 324/88 |
| 3,299,352 | 1/1967 | Carroll | 324/88 |
| 3,408,566 | 10/1968 | Norwich | 324/61 R |
| 3,651,505 | 3/1972 | Schmidt | 324/61 R |
| 3,725,636 | 4/1973 | Toth | 219/130.01 |
| 3,970,911 | 7/1976 | Schmall | 219/124.02 |
| 4,000,448 | 12/1976 | Shum et al. | 219/69 G |
| 4,241,995 | 12/1980 | Takahama | 324/83 R |
| 4,267,423 | 5/1981 | Bell, Jr. et al. | 219/69 C |

Primary Examiner—C. C. Shaw
Attorney, Agent, or Firm—Hayes & Reinsmith

[57] ABSTRACT

A method and apparatus for detecting the point of contact between a workpiece of electrically conductive material in a machine and an electrically conductive element movable relative to and insulated from the workpiece, such as the electrode of an electrical discharge machine, wherein in a time-varying signal, in particular sinusoidal, of predetermined amplitude and frequency is applied to the workpiece, a signal is derived from the conductive element or electrode resulting from the flow of current through the gap between the workpiece and conductive element in response to the applied signal, and the applied and derived signals are compared as to amplitude and phase angle. An indication of the comparison is provided with the result that the combination of an amplitude difference and a phase difference between the applied and derived signals indicates the status of the contact gap, respectively, between the workpiece and conductive element or electrode. The comparison and indication can be performed in an analog manner by means including a cathode ray tube providing a visual display of the amplitude and phase comparisons of the applied and derived signals as Lissajous patterns. The comparison and indication also can be performed in a digital manner by circuit means providing logical states indicating the results of the amplitude and phase comparisons of the signals, which logical states can be utilized to provide visual indications of the same.

21 Claims, 20 Drawing Figures

CONTACT DETECTOR

This application is a continuation-in-part of U.S. patent application Ser. No. 06/195,369 filed Oct. 9, 1980, now abandoned.

BACKGROUND OF THE INVENTION

This invention relates to the art of electrically sensing physical contact between two relatively movable conductive elements, and more particularly to a new and improved method and apparatus for detecting the point of contact between a conductive workpiece and a relatively movable conductive element such as an electrode insulated from the workpiece.

One area of use of the present invention is for determining the point of contact between the workpiece and electrode of an electrical discharge machine, although the principles of the present invention can be variously applied. The point of contact between the workpiece and electrode in an electrical discharge machine must be very critically determined in order to achieve the desired workpiece accuracy. However, problems such as transient contact, varying gap geometry, dielectric gap contamination, etc. associated with determining such accuracy of contact have not been solved by the prior art. A related illustration of such problems in ascertaining accuracy of contact involved the use of "whisker" electrodes to drill very small diameter holes in a workpiece and the fact that an oil drop on the workpiece can exert sufficient force on the electrode to cause that electrode to deflect and thereby give a false reading of the contact position.

SUMMARY OF THE INVENTION

It is, therefore, a primary object of this invention to provide a new and improved method and apparatus for electrically sensing physical contact between two relatively movable conductive elements.

It is a more particular object of this invention to provide a new and improved method and apparatus for detecting the point of contact between a conductive workpiece in a machine and a relatively movable conductive element insulated from the workpiece.

It is a further object of this invention to provide such a method and apparatus which accurately distinguishes between no contact, dielectric contamination, transient contact and actual contact between a conductive element and a conductive workpiece.

It is a further object of this invention to provide such a method and apparatus which accurately and effectively determines the point of contact between the workpiece and electrode of an electrical discharge machine.

It is a further object of this invention to provide such a method and apparatus which is electrically compatible with electrical discharge machines.

It is a further object of this invention to provide such a method and apparatus which is accurate, easy to use, relatively simple in construction and which provides readily visible indications of the various conditions such as no contact, dielectric contamination, vibratory or intermittent contact, and actual contact between the conductive element and conductive workpiece.

The present invention provides a method and apparatus for detecting the point of contact between a workpiece of electrically conductive material in a machine or in a measuring device and an electrically conductive element movable relative to and insulated from the workpiece and defining a gap when spaced from the workpiece, wherein a time-varying electrical signal of predetermined amplitude and frequency is applied to the workpiece, a signal is derived from the conductive element resulting from the flow of electrical current between the workpiece and conductive element through the gap in response to the applied signal, and the applied and derived signals are compared as to amplitude and phase angle. An indication of the comparison is provided with the result that various combinations of an amplitude difference and a phase difference between the applied and derived signals indicates the conditions of no contact, contamination, vibratory contact or contact, respectively, between the conductive element and the workpiece. In one form of the invention the comparison and indication is performed by cathode ray tube means for providing a visual display of the amplitude and phase comparisons of the applied and derived signals in the form of Lissajous patterns and analog circuit means for coupling the cathode ray tube means to the applied and derived signals. In another form of the invention, the comparison and indication is performed by digital logic circuit means which provides logical states indicative of the results of the amplitude and phase comparisons of the applied and derived signals together with means connected to the logic circuit means for providing a visual indication of the results of the comparisons or, if desired, a control device in lieu of a visual indicator.

The foregoing and additional advantages and characterizing features of the present invention will become clearly apparent upon a reading of the ensuing detailed description together with the included drawing wherein:

DETAILED DESCRIPTION OF THE ILLUSTRATED EMBODIMENTS

Basic contact detection methods and apparatus for use with machine tools or measuring devices where the contact probe can be insulated from the workpiece, and particularly for determining the point of contact between workpiece and electrode of an electrical discharge machine, utilize changes in amplitude of an electrical signal as the detection parameter. In accordance with the present invention, a sinusoidal signal of predetermined amplitude and frequency is applied to the conductive workpiece, such as through the conductive base of an electrical discharge machine, and a signal is derived from the conductive element movable relative to the workpiece, such as the electrode carried by the ram of an electrical discharge machine, the derived signal resulting from the flow of electrical current between the workpiece and conductive element through a gap therebetween in response to the applied signal. The applied and derived signals are compared as to amplitude and phase angle and an indication of the comparison is provided with the result that the combination of amplitude difference and phase difference between the applied and derived signals indicates the various conditions of gap contamination, no contact, intermittant contact, or actual contact, respectively, between the movable conductive element or electrode and the workpiece. The presence of dielectric contamination in the narrow gap between electrode and workpiece is readily distinguished from actual contact because the presence of such dielectric contamination results in at least a measurable phase shift between the applied and derived signals.

In one embodiment, a cathode ray tube device is employed for providing a visual display of the amplitude and phase comparisons of the applied and derived signals in the form of Lissajous patterns. A pair of high impedance amplifiers couple the applied and derived signals to the horizontal and vertical deflection plates, respectively, of the cathode ray tube device. In another embodiment, digital logic states are provided indicative of the results of the amplitude and phase comparisons. In particular, the applied and derived signals are converted to pulse signals having phases related to their corresponding original phases, and the pulse signals are compared as to phase angle to provide an output signal having two logical states indicating the presence or absence of a phase difference between the applied and derived signals. The d.c. signal obtained from the derived signal amplitude is compared to a reference to provide a signal having two logical states indicating whether or not the derived signal is greater in amplitude than the reference. The logic signals are utilized by a circuit for providing a visual indication of the various states, such as by means of light emitting diodes, which also is a visual indication of the results of the amplitude and phase comparisons of the applied and derived signals. In all embodiments of the contact detection apparatus when used with electrical discharge machines, the apparatus is referenced to a floating electrical ground, and interlock switching means is included for preventing application of electrical power to the discharge machine contact gap during operation of the contact detection apparatus.

Figure 1:
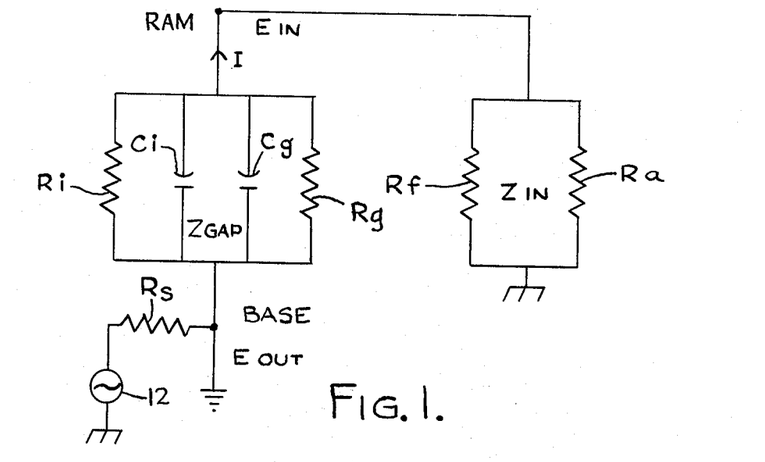
FIG. 1 is a schematic circuit diagram illustrating the principles of the present invention when used in determining the point of contact between electrode and workpiece in an electrical discharge machine.

Referring now to the drawings the method and apparatus of the present invention, generally speaking, is for use in detecting the point of contact between a workpiece of electrically conductive material in a machine and an electrically conductive element movable relative to and insulated from the workpiece and defining a gap when spaced from the workpiece. One particular area of use is for positioning electrodes on electrical discharge machines wherein the electrically conductive workpiece is supported on a machine base of electrically conductive material and an electrode is carried by an insulated ram which is movable toward and away from the workpiece. The operation of electrical discharge machines, wherein an electrical arc produced between the electrode and workpiece erodes the workpiece to machine the same is well known. FIG. 1 is a schematic circuit diagram illustrating the operation of the method and apparatus of the present invention used for determining the point of contact between electrode and workpiece in an electrical discharge machine. According to the present invention a time-varying electrical signal of predetermined amplitude and frequency is preferably applied to the workpiece although the signal can be applied to the ram without departing from the invention. In particular, an oscillator 12 generates a sinusoidal signal which is applied to the electrically conductive base of an electrical discharge machine and thus to the conductive workpiece which is in contact with the base. The internal resistance of the signal source is designated $R_s$ in FIG. 1. In electrical discharge machines the base is connected to earth ground as shown in FIG. 1 for reasons of safety. Accordingly, the apparatus according to the present invention including oscillator 12 is connected to an internal electrical ground which is floating with respect to earth ground to avoid short circuiting the applied signal designated $E_{out}$ in FIG. 1.

It has been determined that a preferable frequency of approximately 150 hertz and an amplitude of one volt for the sine wave signal generated by oscillator 12 produce desirable results when the method and apparatus of the present invention are used wih electrical discharge machines. The frequency was selected in a manner balancing the conflicting requirements of being high enough to facilitate filtering out ambient 60 hertz related electrical noise, low enough to facilitate filtering out high frequency electrical noise caused by adjacent operating electrical discharge machines, low enough to minimize the effect of machine tool ram-to-base insulator impedance and low enough to minimize the effect of contact air gap impedance. The peak voltage of the sine wave signal was determined in a manner minimizing signal current and hysteresis. By hysteresis is meant the phenomenon resulting when the electrode is brought into apparent contact with the workpiece and removed from apparent contact to produce a measurable dead band. In other words, the apparent making of contact and apparent breaking of contact does not necessarily occur at the same specific point under hysteresis.

According to the present invention, an electrical signal is derived from the conductive element, i.e. the electrode in an electrical discharge machine, resulting from the flow of electrical current between the workpiece and conductive element through the gap between the workpiece and element in response to the application of the signal $E_{out}$. The current flow and derived signal are designated I and $E_{in}$, respectively in FIG. 1. The gap between the workpiece and conductive element has an electrical impedance identified $Z_{gap}$ in FIG. 1, which gap impedance results from the parallel combination of the quantities designated Ri, Ci, Cg and Rg in FIG. 1. Ri is the constant ram-to-base insulator resistance in an electrical discharge machine and usually has a magnitude greater than 1000 megohms so that it can be ignored in the present analysis. Ci is the constant ram-to-base insulator capacitance in an electrical discharge machine and is approximately 0.001 microfarads for most machines. Rg is the variable contact gap resistance which varies in a range from about greater than 0.1 ohm to substantially an infinite resistance. Cg is the variable contact gap capacitance and is related to the electrode-workpiece overlapping surface area, the electrode-workpiece separation distance and the dielectric constant of the medium separating the electrode and the workpiece.

Figure 2:
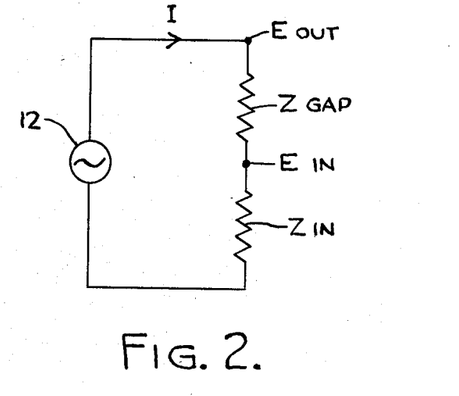
FIG. 2 is a simplified version of the schematic circuit of FIG. 1.

A parallel filter-amplifier combination (not shown in FIGS. 1 and 2 but illustrated in FIGS. 5 and 7) is used to measure the derived signal $E_{in}$ which will be described in detail presently, and the input impedance of this combination is designated $Z_{in}$ in FIG. 1. The input filter is a parallel L-C tuned circuit which is resonant at the frequency $E_{out}$ and connected across the amplifier input terminals. Since the L-C circuit operates as a bandpass filter at resonance with respect to the sine wave input signal, its effective impedance with the respect to $E_{in}$ is purely resistive and is designated $R_f$ in FIG. 1. In other words, the L-C tuned circuit which is resonant at the frequency of $E_{in}$ and $E_{out}$ *is in parallel with the amplifier input and thus ideally that L-C filter becomes a pure resistance load across the amplifier input. The effective impedance $R_f$ has a* relatively high design value of approximately 330,000 ohms to minimize signal loading and to increase sensitivity. The amplifier input impedance is essentially resistive at this low frequency and is depicted in FIG. 1 as Ra. Since the amplifier employed is an operational amplifier, Ra is quite high, having a magnitude of approximately one megohm. Therefore, $Z_{in}$ is essentially resistive and equal to approximately 250,000 ohms. As shown in FIG. 1, both $R_f$ and Ra are connected to the internal floating ground of the apparatus. The arrangement of FIG. 1 can be simplified by impedance combination and depicted as a simple voltage divider as shown in FIG. 2. The signal current, I, is determined by the relationship $$I = \frac{E_{out}}{Z_{gap} \& Z_{in}}.$$

Since $Z_{in}$ is purely resistive, $E_{in}$ is in phase with I and determined by the relationship $E_{in}=(I)(Z_{in})$.

In accordance with the present invention, the applied and derived signals, in particular $E_{out}$ and $E_{in}$, are compared as to relative amplitude and as to relative phase angle, and when the workpiece and electrode are in actual physical contact there is no measurable difference in amplitude and no measurable phase shift between the two signals. When the workpiece and conductive elements are not in contact there is at least a measurable phase shift between the applied and derived signals $E_{out}$ and $E_{in}$, respectively, and usually also a measurable difference in amplitude.

Figure 3A:
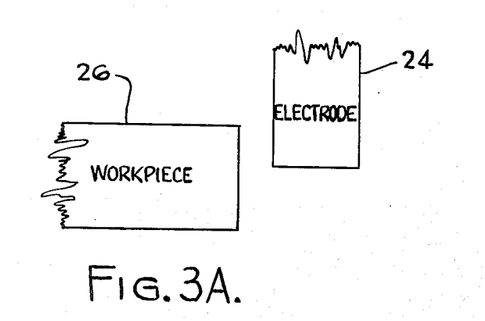
FIGS. 3A, 3B and 3C are schematic diagrams illustrating the conditions of no contact, dielectric contamination and contact, respectively, between electrode and workpiece in an electrical discharge machine.
Figure 3B:
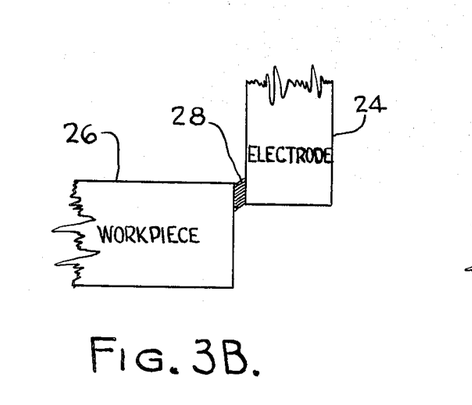
Figure 3C:
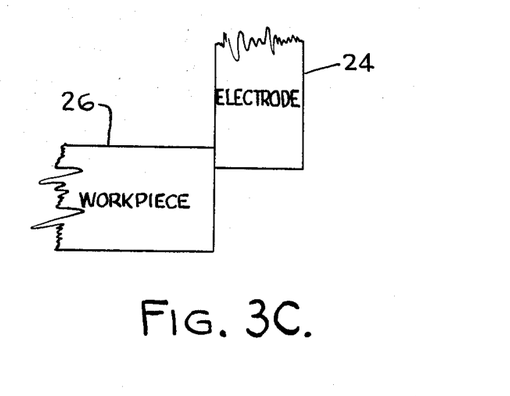

The foregoing will be illustrated in further detail for the three basic situations of no contact between electrode 24 and workpiece 26 shown in FIG. 3A, dielectric contamination 28 caused for example by oxide films, dielectric oils or insulating dust between electrode 24 and workpiece 26 as shown in FIG. 3B and actual contact between workpiece 26 and electrode 24 as shown in FIG. 3C. the following constants and other quantities will be used by way of example:

F = 150 hertz W=2 F=9.42×10² rad/sec.
$R_i$=1000 megohms (assumed infinite) $C_i=10^{-9}$ farads $Z(Ci)=1/jWCi=-1.06\times 10^6 j$  $Z_{in}=2.5\times 10^5$
$E_{out}$=Sin Wt=Cos (Wt−90°)=1∠−90°

Under the conditions of no contact shown in FIG. 3A, $R_g$ is infinite, Cg is negligible, and Ci is the only significant factor in $Z_{gap}$. Therefore, $Z_{gap}$ is very high and essentially capacitive. The ratio Ein/Eout will be relatively small and there will be a substantial phase shift between $E_{in}$ and $E_{out}$. The signal current is determined by the relationship $$I = \frac{E_{out}}{Z_{gap} + Z_{in}}$$

where $Z_{gap}+Z_{in}=Z(Ci)+Z_{in}=2.5\times 10^5-1.061\times 10^6 j=1.09\times 10^6\angle -76.74°$, the result being expressed as a magnitude and phase angle according to known mathematical techniques. Therefore, $$I = \frac{1\angle -90°}{1.09\times 10^6\angle -76.74°} = 9.17\times 10^{-7}\angle -13.26°.$$

Figure 4A:
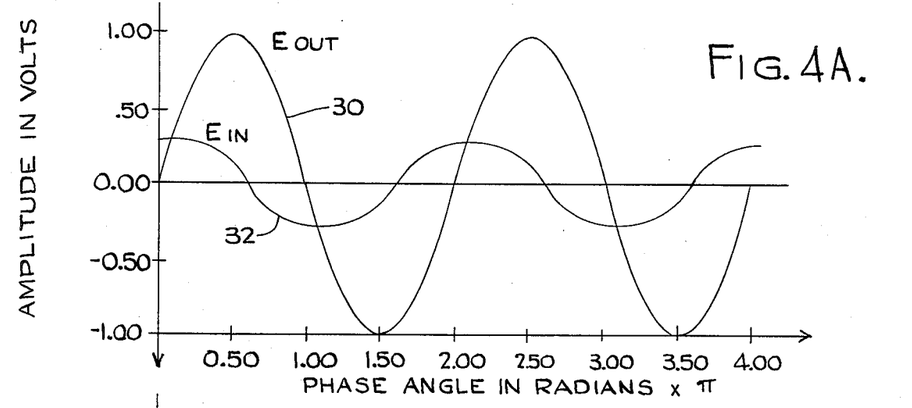
FIGS. 4A, 4B and 4C are graphs illustrating waveforms from the circuits of FIGS. 1 and 2 for the conditions of no contact, dielectric contamination and contact, respectively, between electrode and workpiece in an electrical discharge machine.

Also, $E_{in}=(I)$ $(Z_{in})=(9.17\times 10^7\angle -13.26°)$ $(2.5\times 10^5)=2.29\times 10^{-1}\angle -13.26°=0.229$ Sin (Wt+76.74°). Thus $E_{in}$ has an amplitude of 0.229 volts as compared to the amplitude of 1.0 volts for $E_{out}$, and $E_{in}$ has a phase shift of 76.74° relative to $E_{out}$. This is illustrated further by the waveforms 30 and 32 of $E_{out}$ and $E_{in}$, respectively, in FIG. 4A. Thus when there is no contact between electrode 24 and workpiece 26 a comparison of $E_{out}$ and $E_{in}$ as to relative amplitude and phase angle according to the present invention provides a measurable amplitude difference and a measurable phase shift.

Under the conditions of a narrow contact gap between workpiece 26 and electrode 24 contaminated by a dielectric 28 other than air as shown if FIG. 3B, the quantities Rg, Cg, and Ci combine to determine $Z_{gap}$. Cg becomes the most significant component resulting in a $Z_{gap}$ that is much lower than the $Z_{gap}$ in the no contact condition, but still primarily capacitive. Typical values are $Cg=5\times 10^{-8}$ farads and $Rg=10$ megohm. The sum of Cg and Ci is $5.1\times 10^{-8}$ farads. Accordingly $$Z(Cg + Ci) = \frac{1}{jW(Cg + Ci)} = -2.08\times 10^4 j, \text{ and}$$

$$Z_{gap} = \frac{Z(Cg + Ci)(Rg)}{Z(Cg + Ci) + Rg} =$$

$$2.08\times 10^4 \angle -89.88° = 43.56 - 2.08\times 10^4 j.$$

Then, $Z_{gap}+Z_{in}=2.50\times 10^5-2.08\times 10^4 j=2.509\times 10^5\angle -4.756°$. The signal current $$I = \frac{E_{out}}{Z_{gap} + Z_{in}} \text{ is}$$

$$\frac{1\angle -90°}{2.509\times 10^5\angle -4.756} = 3.98\times 10^{-6}\angle -85.244°.$$

Figure 4B:
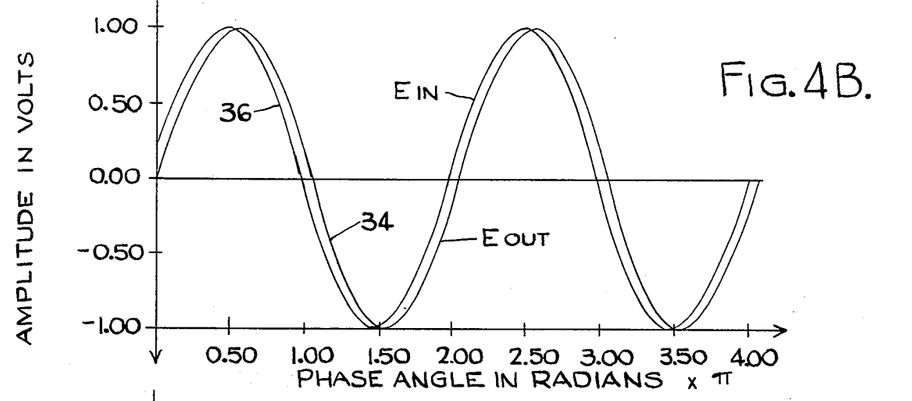

Also $E_{in}=(I)$ $(Z_{in})=(3.98\times 10^{-6}\angle -85.244°)$ $(2.5\times 10^5)=9.95\times 10^{-1}\angle -85.244°=0.995$ Sin (Wt+4.756). Thus $E_{in}$ has an amplitude of 0.995 volts as compared to the amplitude of 1.0 volt for $E_{out}$, and $E_{in}$ has a phase shift of 4.756° relative to $E_{out}$. This is illustrated further by the waveforms 34 and 36 of $E_{out}$ and $E_{in}$, respectively, in FIG. 4B. Thus, even though the magnitude of $E_{in}$ can be quite close to that of $E_{out}$ when dielectric contamination is present between workpiece and electrode, there still will be a measurable phase shift between $E_{out}$ and $E_{in}$ when compared according to the present invention.

Under the condition of actual physical contact shown in FIG. 3C, Rg is very low because all electrode and workpiece materials are excellent electrical conductors. The effects of Ci and Cg become negligible in comparison to Rg, and therefore $Z_{gap}$ is very low and essentially resistive. It then follows that $E_{in}$ will be equal to and in phase with $E_{out}$. Typical values are Rg=1 ohm, Cg=zero farads, and $Z_{gap}=1$. The sum $Z_{gap}+Z_{in}=2.5\times10^5+1=2.5\times10^5$. The signal current $$I = \frac{E_{out}}{Z_{gap} + Z_{in}} = \frac{1\angle-90°}{2.5\times10^5} = 4\times10^{-6}\angle-90°.$$

Figure 4C:
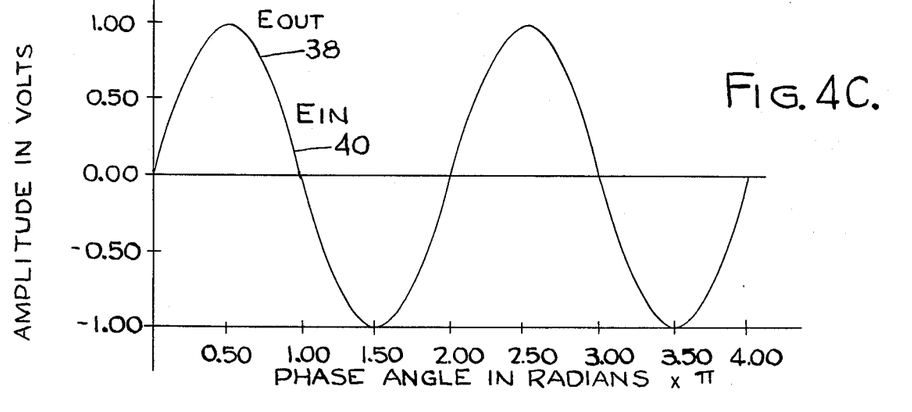

Also, $E_{in}=(I)(Z_{in})=(4\times10^{-6}\angle-90°)(2.5\times10^5)=1\angle-90°=$ Sin Wt. Thus $E_{in}$ has an amplitude of 1.0 volt as compared to the amplitude of 1.0 volt for $E_{out}$, and $E_{in}$ has zero phase shift relative to $E_{out}$. This is illustrated further by the waveforms 38 and 40 of $E_{out}$ and $E_{in}$ in FIG. 4C. When there is actual contact between electrode 24 and workpiece 26 a comparison of $E_{out}$ and $E_{in}$ as to relative amplitude and phase angle according to the present invention indicates no amplitude difference and no phase shift.

Thus, the method and apparatus of the present invention utilize phase angle in conjunction with signal amplitude to indicate contact gap status. Prior art d.c. contact detection methods which typically employ an ohmmeter cannot indicate dielectric contamination between electrode and workpiece and the surface tension associated with such contamination. In addition, such methods force the operator to decide what amount of meter deflection represents actual contact. Other prior art methods of the a.c., amplitude-only type fail to accurately discriminate between dielectric contamination and contact. As shown in the foregoing illustration of dielectric contamination, $E_{in}$ was within 0.005 volt of $E_{out}$ but there still was a significant phase difference to indicate contact had not yet occurred. Repeatability, hysteresis and accuracy are additional advantages of the method and apparatus of the present invention.

Figure 5:
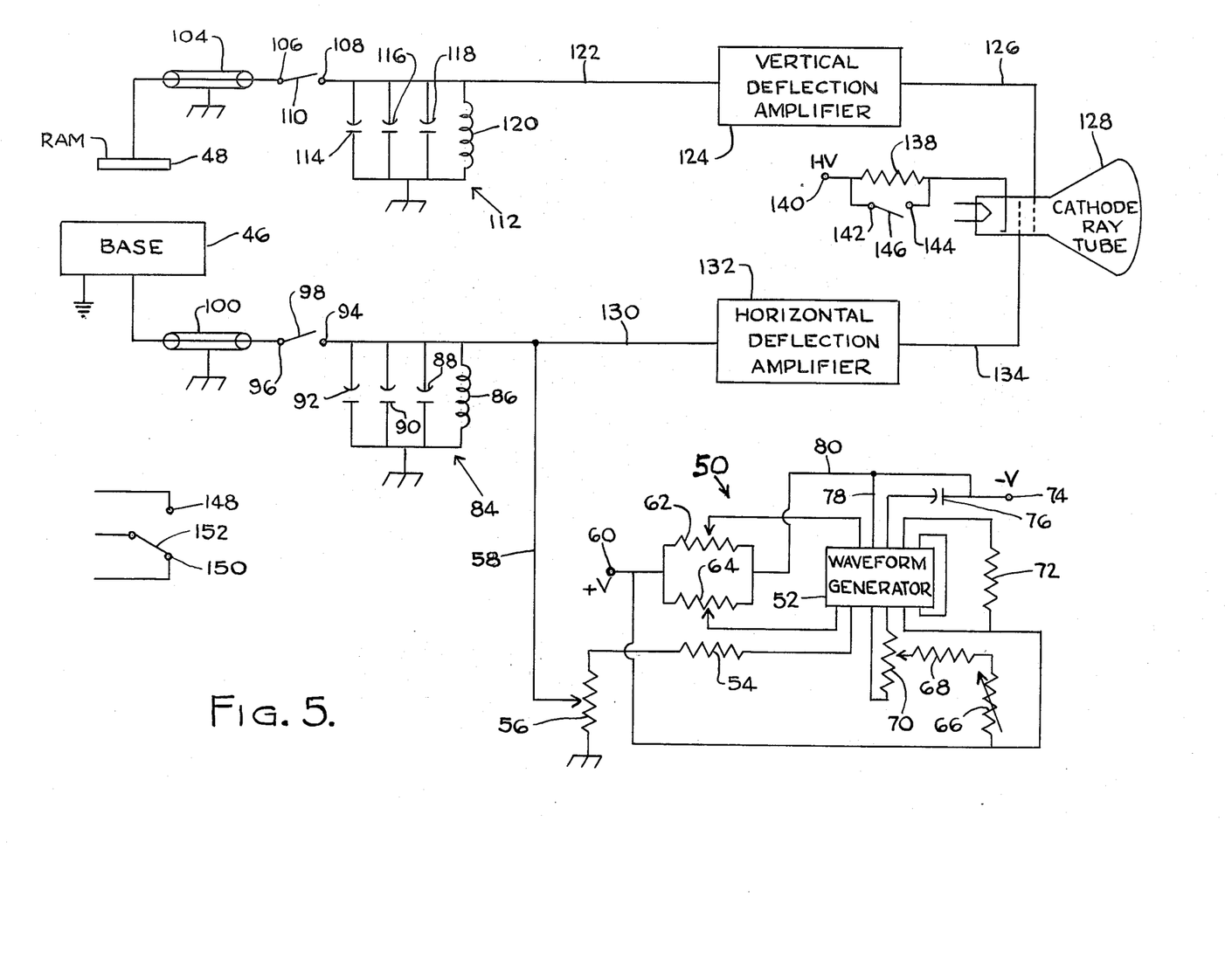
FIG. 5 is a schematic block diagram of contact detection apparatus according to one embodiment of the present invention.

FIG. 5 illustrates one form of contact detection apparatus according to the present invention for use with an electrical discharge machine having a base designated 46 of conductive metal which is connected to earth ground as shown in FIG. 5 and which supports a metal workpiece (not shown) to be machined in a known manner. The machine also includes a ram 48 movable toward and away from base 46 which carries the electrode (not shown) of the machine and for which it is desired to detect the point of contact with the workpiece. The apparatus includes means in the form of an oscillator generally designated 50 for generating a time-varying signal, in particular a sinusoidal signal, having a predetermined amplitude and frequency. Oscillator 50 can have many forms, one of which is illustrated in FIG. 5 including a waveform generator 52, the output of which is connected through a resistor 54 to one terminal of a potentiometer 56, the other terminal of which is connected to the internal chassis floating ground of the apparatus. The output of the oscillator 50 is present on line 58 connected to the wiper arm of potentiometer 56. A source of positive bias voltage connected to terminal 60 is applied through a network comprising the parallel combination of potentiometers 62, 64 and through another network comprising the combination of variable resistor 66, resistor 68 and potentiometer 70 and through resistor 72 to appropriate terminals of the waveform generator 52 as shown in FIG. 5. A source of negative bias voltage connected to terminal 74 is applied through capacitor 76 and lines 78, 80 to appropriate terminals of the waveform generator and to the resistive network as shown in FIG. 5.

The apparatus further comprises means for applying the time varying signal to the workpiece. The oscillator sinusoidal output signal on line 58 is connected to an input of a filter in the form of a tuned circuit generally designated 84 which serves to prevent ambient gap electrical noise feedback to the horizontal deflection amplifier 132. The gap ambient frequencies include not only 60 cycle frequencies and harmonics and stray signals found in a shop or factory arising from other operating equipment but also the harmonics generating by adjacent electrical discharge machines wherein the spark gap between the electrode and workpiece functions as a spark-gap frequency generator. The filter 84 comprises the parallel combination of an inductor 86 and capacitors 88, 90 and 92 to facilitate tuning. The filter 84 is connected between line 58 and the internal chassis floating ground as shown in FIG. 5. The output signal from filter 84 passes through interlock relay contacts 94, 96 when joined by switch arm 98 which interlock serves to isolate the output circuit of the contact detection apparatus from the electrical discharge machine during spark erosion for a purpose which will be described in detail presently. The signal then is fed through a shielded cable designated 100 to the machine tool base 46 and thus applied to the conductive metal workpiece (not shown) which is in contact with the conductive base 46. As shown in FIG. 5 shielded cable 100 also is connected to the floating electrical ground.

The apparatus of the present invention further comprises means connected to the electrically conductive element, i.e. to the electrode carried by ram 48, for deriving a signal therefrom as a result of the flow of current between the workpiece and conductive element through the gap therebetween. One end of a shielded cable 104 is connected to ram 48, and the other end of cable 104 is connected through interlock relay contacts 106, 108 when joined by a switch arm 110 to the input of a filter 112 which is similar to filter 84. As shown in FIG. 5, shielded cable 104 is connected to the internal chassis floating ground. Filter 112 is a tuned circuit including the parallel combination of three capacitors 114, 116 and 118 and an inductor 120 similar to filter 84. Filter 112 is connected to the internal chassis floating ground, and the output of filter 112 is present on a line 122.

The apparatus of the present invention further comprises means connected to the signal generating means and to the signal deriving means for comparing the applied and derived signals as to amplitude and phase angle and for providing an indication of the comparison. In this embodiment the comparison and indication is performed in an analog manner. In particular, the comparing and indicating means comprises a cathode ray tube means for providing a visual display of amplitude and phase comparisons of the applied and derived signals in the form of Lissajous patterns and analog circuit means for connecting the cathode ray tube means to the signal generating means and to the signal deriving means. As shown in FIG. 5, line 122 from the output of the signal deriving means is connected to the input of a vertical deflection amplifier 124, the output of which is connected by line 126 to the vertical deflection plates of a cathode ray 128. Similarly, line 58 from the output of oscillator 50 is connected by a line 130 to the input of a horizontal deflection amplifier 132, the output of which is connected by a line 134 to the horizontal deflection plates of the cathode ray tube 128.

In the apparatus shown, a resistor 138 is connected in series between the high voltage terminal 140 and the intensity circuit of the cathode ray tube device 128. The interlock relay contacts 142, 144 when opened by switch arm 146 are opened across resistor 138 to blank the cathode ray tube trace when the contact gap of the electrical discharge machine is not being monitored. Also shown in FIG. 5 is the main interlock arrangement of contacts 148, 150 and switch arm 152 movable therebetween which is operatively associated with the electrical discharge machine power supply to prevent spark erosion while the contact detecting apparatus is monitoring the contact gap. Because parameters across the air gap between the electrode and workpiece are being measured, it is essential that the basic electrical discharge machine apparatus be disconnected from its power source during monitoring since inadvertent energization of the electrical discharge machine would produce a significant signal across the gap and probably damage the detector apparatus.

Figure 6A:
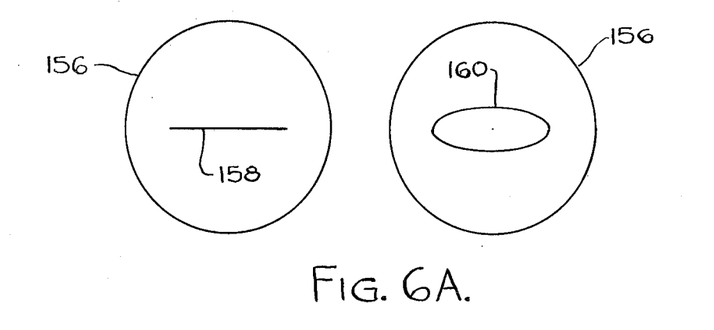
FIGS. 6A–6D are graphs illustrating the visual indications provided by the apparatus of FIG. 5.

The input signal to amplifier 124 has the same frequency as the input signal to amplifier 132 but varies in phase and amplitude depending on the machine tool ram-to-base contact condition. The combination of signals of the same frequency but varying in phase and amplitude produces various patterns on the display of the cathode ray tube 128 as shown in FIGS. 6A-6D wherein the outline or perimeter of the display, i.e. the oscilloscope screen, is indicated by the circle 156. Referring first to FIG. 6A, this shows the patterns for the condition of no contact between the conductive element or electrode and workpiece which patterns can be either a horizontal line 158 or an ellipse 160 wherein the major axis is virtually horizontal and the width is much greater than the height. The foregoing can vary among the electrical discharge machines depending upon the capacitance of the ram-to-base insulator junction. The gap capacitive reactance which is inherent in the machine typically is quite small, and therefore does not adversely affect sensitivity of the contact detection apparatus.

Figure 6B:
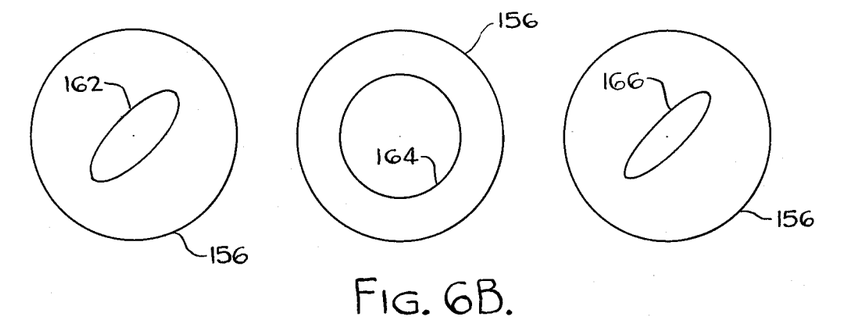

FIG. 6B illustrates patterns obtained during the condition of dielectric contamination in the narrow gap between the electrode and workpiece which are the various elliptical patterns designated 162, 164, and 166. In particular, during contamination the pattern is an ellipse with its major axis disposed at an angle to the horizontal, the angle of the major axis to the horizontal and the height-to-width ratio of the ellipse varying with the degree of contamination and proximity of electrode to workpiece. With a high degree of contamination and a small gap, the ellipse will approximate a line inclined 45° from the horizontal, similar to the pattern 166 in FIG. 6B. With respect to contamination, this generally is meant to be dielectric contamination such as oil, oxides, etc. because if the contamination is metallic it obviously will give a false indication of contact. More importantly, electrical discharge machines generally function with an oil flush during operation and it is exceedingly difficult to create totally clean conditions for measuring the desired contact point. Furthermore, even a drop of oil can deflect very fine electrodes. The detector of the present invention advantageously provides an indication of such dielectric contamination so that such contamination can be removed before proceeding.

Figure 6C:
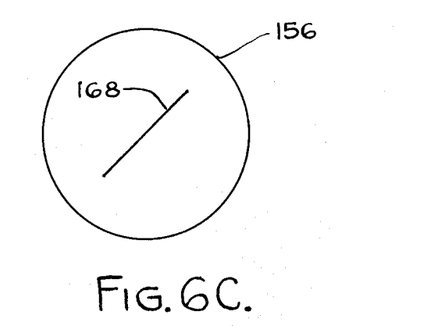
Figure 6D:
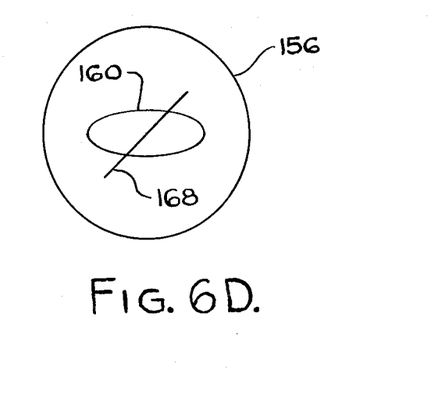

FIG. 6C illustrates the pattern obtained during actual contact which is a sharp line 168 inclined at an angle of about 45° to the horizontal. FIG. 6D illustrates patterns derived during the condition of vibration which is a superimposed pattern of the contact line 168 and the no contact ellipse 160. These conditions do not occur simultaneously, but the cathode ray tube phospher persistance and the human perception make them appear as if they do.

By way of example, in an illustrative circuit, waveform generator 52 is an Intersil no. 8038CC waveform generator, output resistor 54 has a magnitude of 1 kilohm, potentiometer 56 has a magnitude of 25 kilohms, potentiometers 62 and 64 each has a magnitude of 100 kilohms, variable resistor 60 has a magnitude of five kilohms, resistor 68 has a magnitude of 4.7 kilohms, potentiometer 70 has a magnitude of 10 kilohms, resistor 72 has a magnitude of 1 megohm, capacitor 76 has a magnitude of 0.1 microfarads and the bias voltages are 15 volts. In filter 84, inductor 86 has a magnitude of 1.5 henries, capacitor 88 has a magnitude of 0.082 microfarads and capacitors 90 and 92 both have magnitudes of 0.33 microfarads. In filter 112, capacitor 114 has a magnitude of 0.1 microfarad, capacitor 116 has a magnitude of 0.01 microfarad and capacitor 118 has a magnitude of 0.002 microfarad. Inductor 120 has a magnitude of 10 henries. Some variation in the magnitudes of the capacitors of both filters 84 and 112 may be necessary to produce resonance at the selected frequency of 150 hertz. Each of the amplifiers 124 and 132 is a Caywood no. 90928 reflection amplifier. The cathode ray tube 128 can comprise the combination of a Caywood no. 90202-D cathode ray tube power supply and a CAYWOOD 90900-62 scope module.

Figure 7:
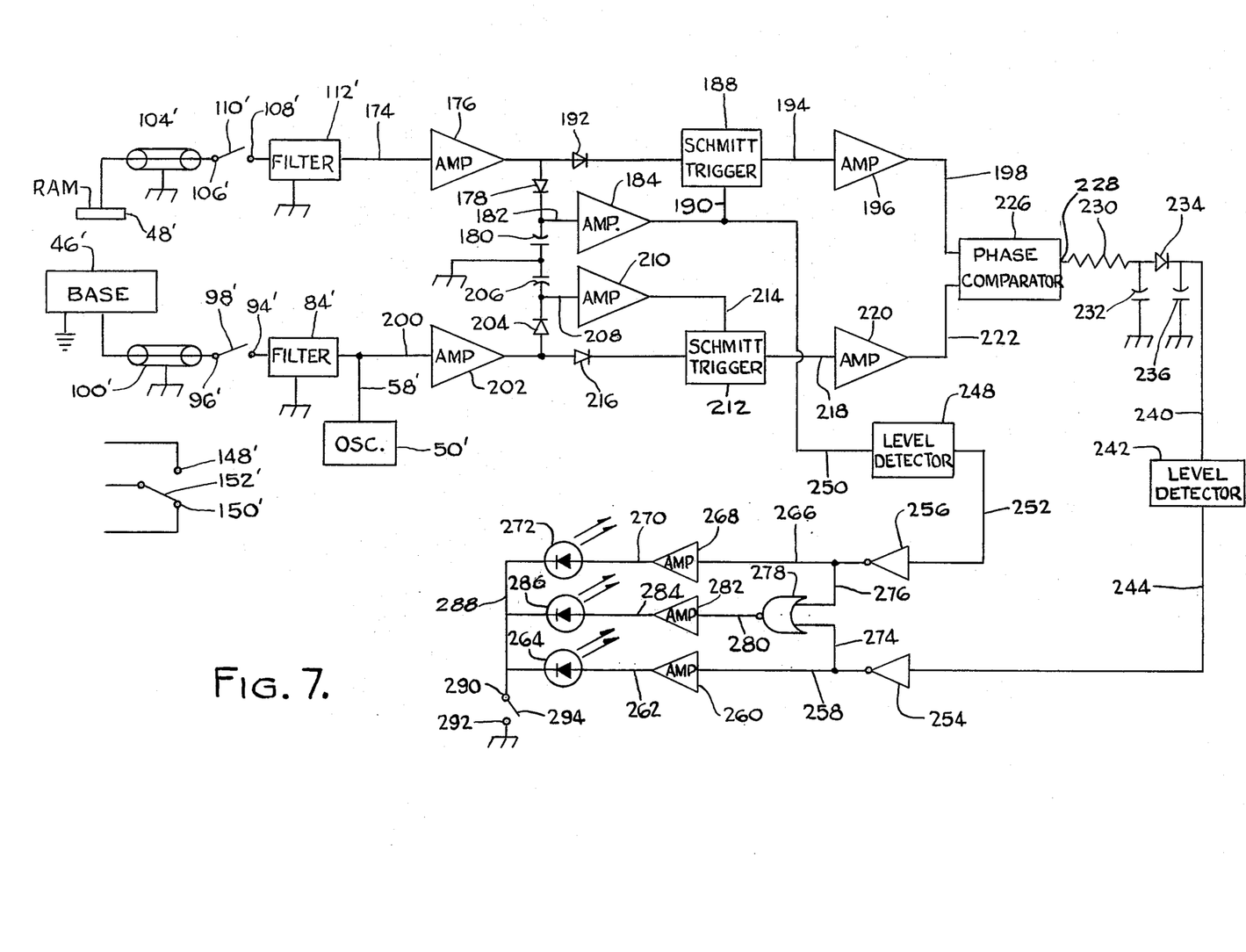
FIG. 7 is a schematic block diagram of contact detection apparatus according to another embodiment of the present invention.

FIG. 7 illustrates another form of the contact detection apparatus according to the present invention for use with an electrical discharge machine. In this embodiment the comparison and indication is performed in a digital manner by circuit means providing logical states indicative of results of the amplitude and phase comparisons of the applied and derived signals. The signal generating means, signal applying means and signal deriving means of this embodiment can be identical to those of the analog embodiment of FIG. 5, and for convenience in illustration like components are identified by the same reference numeral having a prime designation. Thus, the output of oscillator 50' on line 58' is fed through a filter 84' or tuned circuit which prevents ambient gap electrical noise feedback to op amp 202. The signal then passes through interlock relay contacts 94', 96' joined by switch arm 98' which isolate the output circuit from the machine tool during spark erosion. The signal then is fed through a shielded cable 100' to the machine tool base 46' and hence to the conductive workpiece. The insulated machine tool ram 48' is connected via a shielded cable 104' to interlock relay contacts 106', 108' which are joined by switch arm 110' and which isolate the input circuit from the ram 48' during spark erosion. The input signal then passes through filter 112' in the form of a tuned circuit which filters ambient gap electrical noise. The output of filter 112' is present on line 174 and this signal has the same frequency as the oscillator output signal on line 58' but varies in phase and amplitude depending upon machine tool ram-to-base contact conditions.

The signal on line 174 is applied to the input of a high impedance operational amplifier 176 having a gain determined to provide an output level which is compatible with devices in subsequent portions of the circuit. By way of example, amplifier 176 has a fixed gain of ten. The output of amplifier 176 is connected to the anode of a diode 178, the cathode of which is connected to one terminal of a capacitor 180. The other terminal of capacitor 180 is connected to the internal or chassis floating ground. The output of amplifier 176 is rectified by diode 178 resulting in a d.c. voltage across capacitor 180 equal to the peak voltage of the signal at the output of amplifier 176. The junction of diode 178 and capacitor 180 is connected by a line 182 to the input of an operational amplifier 184 having a fixed gain of one.

The converting means further comprises a Schmitt trigger circuit generally designated 188, and the output of amplifier 184 is connected by line 190 to the power terminal of Schmitt trigger 188. The output of amplifier 176 also is connected to the anode of another diode 192, the cathode of which is connected to the input of Schmitt trigger 188. The Schmitt trigger 188 is set to switch at 50% of the voltage on its power terminal resulting in a square wave output on line 194 connected to the output of Schmitt trigger 188 having an amplitude equal to the peak voltage at the output of amplifier 176 and a pulse width that is independent of the amplitude of the signal at the output of amplifier 176. In other words, a floating 50% level is used for the Schmitt trigger so as to insure that the pulses will have the same width regardless of derived signal amplitude. The pulse signal on line 194 is applied to the input of an operational amplifier 196 having a fixed gain of ten to provide a saturated pulse output on line 198 having a constant pulse width and amplitude. Only the phase of the pulse signal on line 198 is related to the phase of the input signal on line 174.

The apparatus of FIG. 7 further comprises means for converting the applied signal to a pulse signal having its phase related to the phase of the applied signal. In particular, the oscillator output on line 58' is connected by a line 200 to an identical conversion circuit as described hereinabove including operational amplifier 202, diode 204, capacitor 206, operational amplifier 210, diode 216, Schmitt trigger 212, and operational amplifier 220. The pulse output signal on line 222 is the reference for phase comparison. Since the oscillator output signal on line 200 passes through circuitry identical to that which the signal on line 174 passes through, any phase shift caused by the conversion circuitry will be self-cancelling.

The apparatus of this embodiment further comprises means connected to both the converting means for comparing the pulse signals as to phase angle to provide an output signal having two logical states indicating the presence or absence of a phase difference between the applied and derived signals. In particular, lines 198 and 222 are connected to the input of a phase comparator 226 which provides an output signal on line 228 having a pulse width related to the phase difference between the signals on lines 198 and 222. The output of phase comparator 226 is applied to an R-C network comprising the combination of a resistor 230 and capacitor 232 connected between line 228 and the internal chassis floating ground. The signal at the junction between resistor 230 and capacitor 232 is a sawtooth waveform having a peak voltage related to the input pulse width. The junction of resistor 230 and capacitor 232 is connected to the anode of a diode 234, the cathode of which is connected to one terminal of a capacitor 236, the other terminal of which is connected to the internal chassis floating ground. The sawtooth waveform charges the capacitor 236 through the diode 234 resulting in a d.c. voltage on line 240 connected to the junction of capacitor 236 and diode 234 that is equal to the sawtooth peak voltage. This d.c. voltage is related to the phase difference between the signals on lines 198 and 222. The phase comparison means further comprises and adjustable level detector 242 having an input connected to line 240 and having an output connected to a line 244. The level detector 242 monitors the voltage on line 240 and provides a logical zero output signal on line 244 when there is an insignificant phase shift between the signals on lines 198 and 222. In other words, the analog signal which is fed through level detector 242 provides a digital signal which is referenced to the phase input.

The apparatus of FIG. 7 further comprises means for comparing the peak amplitude of the derived signal to a reference to provide a signal having two logical states indicating whether or not the derived signal is greater in amplitude than the reference. In particular, there is provided an adjustable level detector 248, the input of which is connected by a line 250 to the output of amplifier 184 and the output of which is connected to a line 252. The adjustable level detector 248 is preset to provide a logical one output signal on line 252 when the signal level on line 250 is greater than a reference cutoff level based on ambient noise and machine tool feed-through capacitance.

The apparatus of FIG. 7 further comprises means connected to the logic circuit means for providing a visual indication of the results of the comparison. In particular, lines 244 and 252 are connected to the inputs of inverters 254 and 256, respectively. The output of inverter 254 is connected by line 258 to the input of a driver amplifier 260, the output of which is connected by a line 262 to the anode of a light emitting diode 264. The output of inverter 256 is connected by a line 266 to the input of a driver amplifier 268, the output of which is connected by a line 270 to the anode of another light emitting diode 272. The outputs of inverters 254 and 256 also are connected by lines 274 amd 276, respectively, to the inputs of a NOR gate 278. The output of gate 278 is connected by a line 280 to the input of a driver amplifier 282, the output of which is connected by a line 284 to the anode of a light emitting diode 286. The cathodes of the light emitting diodes are connected by a line 288 through interlock relay contacts 290, 292 joined by arm 294 to the internal or chassis floating ground. As in the previous embodiment the interlock relay contacts 150' and 148' joined by arm 152' are connected to the machine tool power supply to prevent spark erosion while the contact detector is monitoring the contact gap. The relay contacts 290, 292 serve to blank out all the gap condition indicator lights when the contact gap is not being monitored.

The operation of the indicating means is summarized in the following truth table:

| R | Q | S | T | U |
|---|---|---|---|---|
| 0 | 1 | 1 | 0 | 0 |
| 1 | 0 | 0 | 0 | 1 |
| 1 | 1 | 0 | 1 | 0 |

The quantities R, Q, S, T and U are the logical states of the signals on lines 252, 244, 270, 284, and 262, respectively. When there is no contact between the electrode and workpiece, the signal level on line 250 is less than the cut-off condition as monitored by level detector 248 and only diode 272, which can be color-coded green, is energized signalling the same. In other words, the signal on line 252 is low and the signal on line 244 is high (phase shift with no contact) so that light emitting diodes 286 and 264 see a logical zero and are turned off while diode 272 see a logical one and is turned on. During the condition of dielectric contamination in the narrow gap between the electrode and workpiece, the signal level on line 250 is greater than the cut-off level as determined by level detector 248 but the signals on lines 174 and 200 are not in phase. Accordingly, only diode 286, which can be color-coded yellow, is energized to indicate the same. In other words, the level climbs above the limit of level detector 248, but because of the inverter 256 the light emitting diode 272 sees a logical zero and is turned off. The output from level detector 242 is high so that the input to the NOR gate 278 is low thereby turning LED 286 on and LED 264 off. When there is actual physical contact between the electrode and workpiece, the signals on lines 174 and 200 are in phase and diode 264 is energized to signal the same. In other words, the level on line 250 is above the limit of level detector 248, and inverter 256 causes diode 272 to see a logic zero and be deenergized. The output from level detector 242 is low so as to provide a high level input to NOR gate 278 to turn LED 286 off and LED 264 on. Diode 264 can be color-coded red. Transient contact gap conditions, i.e. vibration, will cause more than one light emitting diode to appear energized at the same time. In addition to providing a visual display of contact gap conditions, the output digital logic states can be interfaced to a machine positioning system providing the possibility of automated contact detection. Also, while negative logic is employed due to the nature of some of the devices in the circuit of FIG. 7, other logic can be used.

Figure 8A:
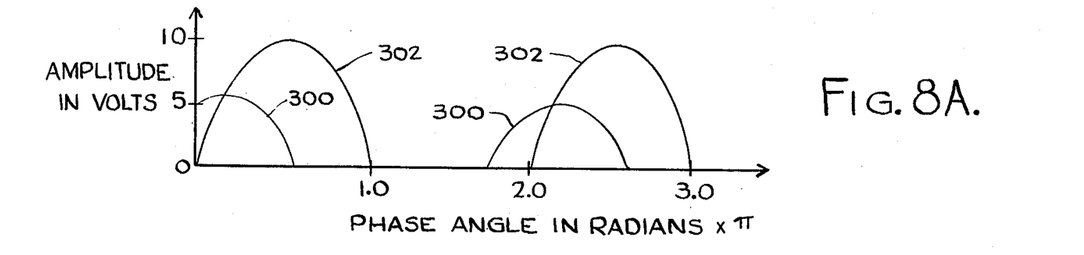
FIGS. 8A–8F are graphs illustrating waveforms at various locations in the apparatus of FIG. 7.
Figure 8B:
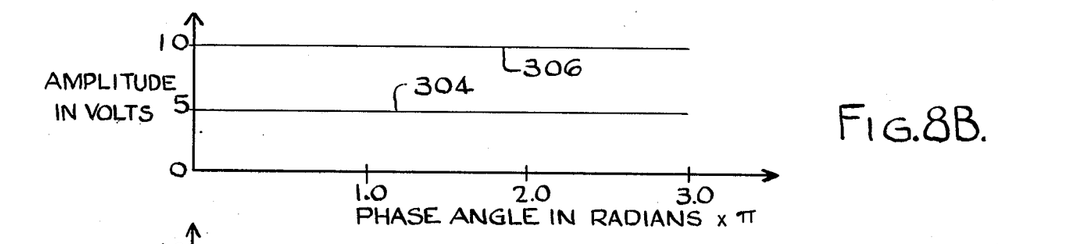
Figure 8C:
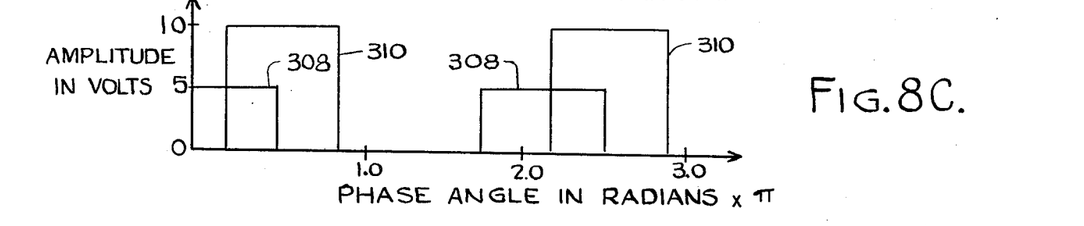
Figure 8D:
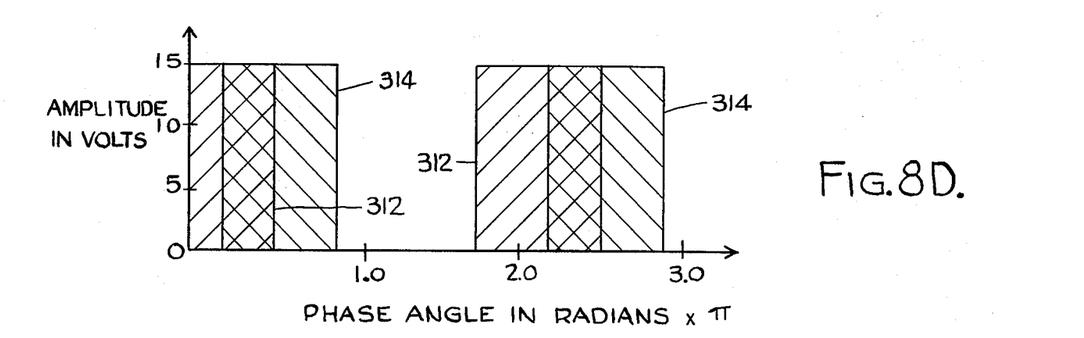
Figure 8E:
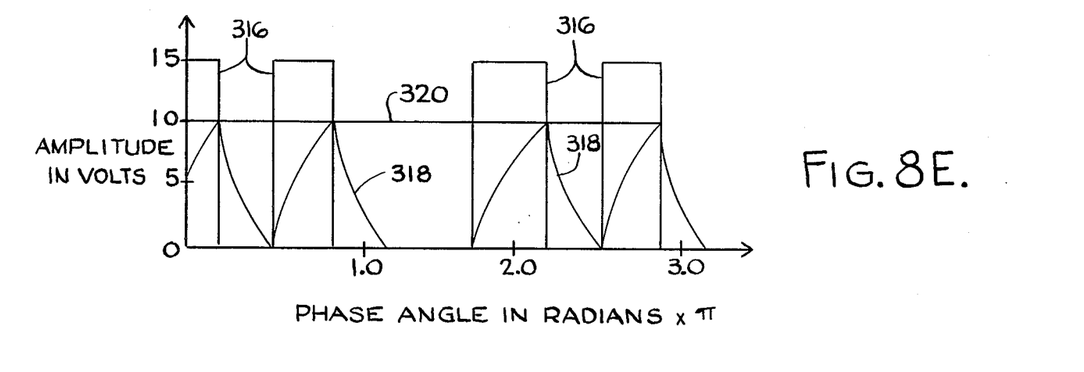
Figure 8F:
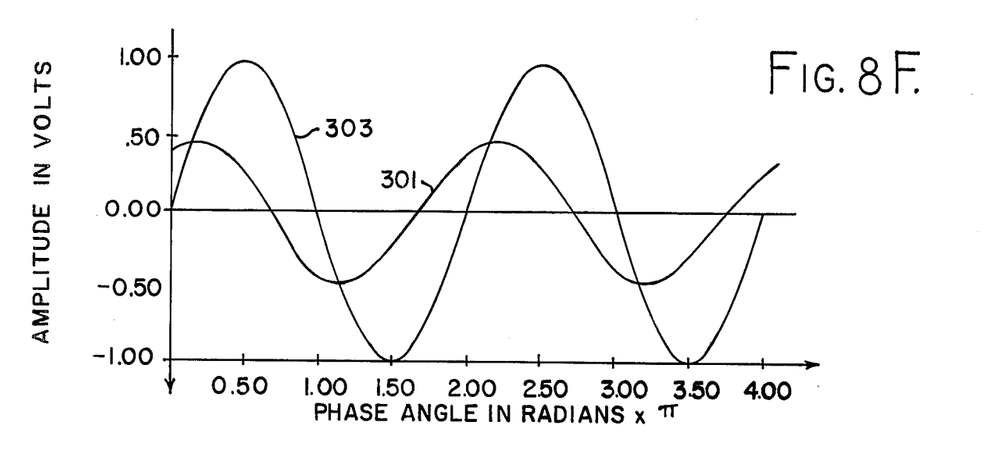

The waveforms in FIGS. 8A-8F further illustrate the operation of the circuit of FIG. 7 for the condition of dielectric contamination. The wafeforms on lines 200 and 174 are shown in FIG. 8F by waveforms 301 and 303 and are similar to the waveforms 30 and 32, respectively in FIG. 4A but differ therefrom in amplitude and phase angle. In FIG. 8A the waveforms 300 and 302 represent the voltages applied to the inputs of the Schmitt triggers 188 and 212, respectively. The d.c. voltage levels designated 304 and 306 in FIG. 8B are applied to the power inputs of the Schmitt triggers 188 and 212, respectively. The pulses 308 and 310 in FIG. 8C are on lines 194 and 218, respectively, in FIG. 7. The pulses 312 and 314 shown in FIG. 8D are on lines 198 and 222, respectively, in FIG. 7. In FIG. 8E, the pulses 316 are present at the output of phase comparator 226, the sawtooth waveform 318 is present at the junction of resistor 230 and capacitor 232, and the level 230 is present at the junction of diode 234 and capacitor 236.

By way of example, in an illustrative circuit, the magnitudes for the components of oscillator 50' and filters 84' and 112' are identical to those given for oscillator 50 and filters 84, 112 in the illustrative circuit of FIG. 5. Each of the amplifiers 176, 184, 196, 202, 210 and 220 is one-half of and RCA SK3465 dual operational amplifier. In amplifiers 176, 196, 202 and 220 each of the feedback resistors has a magnitude of 9.1K and in amplifiers 184 and 210 the feedback path is a short circuit. Capacitors 180 and 206 both have magnitudes of 0.001 microfarad. Schmitt triggers 188 and 212 are Motorola HEP C4052P dual type. Phase comparator 226 is a Motorola HEP C4053P phase locked loop. Resistor 230 has a magnitude of 10K and capacitors 232 and 236 both have magnitudes of 0.1 microfarad.

It is therefore apparent that the present invention accomplishes its intended objects. While several embodiments of the present invention have been described in detail, this is for the purpose of illustration not limitation.

I claim:

1. Apparatus for detecting the point of contact between a workpiece element of electrically conductive material in a machine or measuring device and an electrically conductive element movable relative to and insulated from said workpiece and defining a gap when spaced from said workpiece comprising:
    (a) means for generating a time-varying signal having a predetermined amplitude and frequency;
    (b) means for applying said signal to one of the elements forming said gap;
    (c) means connected to the other of said elements forming said gap for deriving a signal therefrom as a result of the flow of electrical current between said workpiece element and conductive element through said gap; and
    (d) means connected to said signal generating means and to said signal deriving means for comparing said applied and derived signals as to amplitude and phase angle and for providing an indication of the comparison with the result that the combination of amplitude difference and a phase difference between said applied and derived signals can indicate the conditions of no contact, gap contamination, vibratory contact, or actual contact, respectively, between said conductive element and said workpiece element.

2. Apparatus according to claim 1, wherein said comparing and indicating means comprises cathode ray tube means for providing a visual display of the amplitude and phase comparisons of said applied and derived signals in the form of Lissajous patterns and analog circuit means for connecting said cathode ray tube means to said signal generating means and said signal deriving means.

3. Apparatus according to claim 2, wherein said cathode ray tube means has horizontal and vertical deflection plates and wherein said analog circuit means comprises high impedance amplifier means for coupling said signal deriving means to said vertical plates and another high impedance amplifier means for coupling said signal generating means to said horizontal plates.

4. Apparatus according to claim 1, wherein said comparing and indicating means comprises digital logic circuit means for providing logical states indicative of the results of the amplitude and phase comparisons of said applied and derived signals.

5. Apparatus according to claim 4, further including means connected to said logic circuit means for providing a visual indication of the results of the comparisons.

6. Apparatus according to claim 4, wherein said digital logic circuit means comprises:
   (a) means for converting said derived signal to a pulse signal having its phase related to the phase of said derived signal;
   (b) means for converting said applied signal to a pulse signal having its phase related to the phase of said applied signal;
   (c) means connected to both of said converting means for comparing said pulse signals as to phase angle to provide an output signal having two logical states indicating the presence or absence of a phase difference between the applied and derived signals; and
   (d) means connected to said means converting said derived signal for comparing said derived signal to a reference to provide a signal having two logical states indicating whether or not said derived signal is greater in amplitide than the reference.

7. Apparatus according to claim 5, wherein said means for providing a visual indication comprises a plurality of light emitting diodes, each one for signaling a different result of the comparisons, and circuit means connected to said light emitting diodes and to said logic circuit means for controlling the energization of particular ones of said light emitting diodes as determined by said logical states.

8. Apparatus according to claim 1, wherein said signal applying means includes filter means for preventing feedback of ambient electrical noise from said gap.

9. Apparatus according to claim 1, wherein said signal deriving means includes filter means for removing ambient electrical noise received from said gap.

10. Apparatus according to claim 1, wherein said machine is an electrical discharge machine wherein said conductive element is an electrode movable toward and away from said workpiece element and said workpiece is supported on an electrically conductive base connected to earth ground, wherein said signal applying means is connected to said machine base, and wherein said apparatus is connected to an electrical ground which is floating with respect to earth ground.

11. Apparatus according to claim 1, wherein said machine is an electrical discharge machine wherein said conductive element is an electrode movable toward and away from said workpiece element and said workpiece is supported on an electrically conductive base, wherein said signal applying means is connected to said base and wherein said signal generating means comprises and oscillator for providing a sinusoidal output signal.

12. Apparatus according to claim 1, wherein said machine is an electrical discharge machine wherein said conductive element is an electrode movable toward and away from said workpiece element and said workpiece is supported on a base, and further including interlock switching means operatively connected to said contact detecting apparatus and to said electrical discharge means for disconnecting electrical power from said discharge machine during operation of said contact detecting apparatus.

13. A method for detecting the point of contact between a workpiece of electrically conductive material in a machine and an electrically conductive element movable relative to and insulated from said workpiece and defining a gap when spaced from said workpiece, comprising the steps of:
   (a) applying to said workpiece an alternating time-varying electrical signal of predetermined amplitude and frequency;
   (b) deriving an electrical signal from said conductive element resulting from the flow of electrical current between said workpiece and conductive element through said gap in response to said applied signal; and
   (c) comparing said applied and derived signals as to amplitude and phase angle to indicate the presence or absence of contact between the conductive element and the workpiece whereby an indication of phase shift and differential amplitude indicates no contact.

14. A method according to claim 13, wherein said steps of comparing said applied and derived signals as to relative phase angle and amplitude are performed simultaneously.

15. A method according to claims 13 or 14, wherein said machine is an electrical discharge machine wherein said conductive element is an electrode and said workpiece is supported on a conductive base connected to earth ground, wherein said step of applying a signal to said workpiece is performed by applying said signal directly to said base, and further including the step of providing a floating electrical ground reference for said applied and derived signals.

16. A method according to claims 13 or 14, wherein said machine is an electrical discharge machine wherein said conductive element is an electrode and said workpiece is supported on a conductive base, and wherein said step of applying a signal to said workpiece is performed by applying directly to said base a sinusoidal signal having an amplitude of one volt and a frequency of 150 hertz.

17. A method according to claim 14, wherein said simultaneous steps of comparing said applied and derived signals as to relative amplitude and phase angle are performed by displaying said applied and derived signals on a cathode ray tube device in the X-Y mode in the form of Lissajous patterns.

18. A method according to claim 17, wherein said applied and derived signals are applied to the vertical and horizontal plates, respectively, of the cathode ray tube device.

19. A method according to claim 14, wherein said simultaneous steps of comparing said applied and derived signals as to relative amplitude and phase are performed in a manner providing digital logic states indicative of the contact condition of said conductive element and said workpiece.

20. A method according to claim 19, wherein said digital logic states are provided by:
   (a) converting said derived signal to a pulse signal having its phase related to the phase of said derived signal;
   (b) converting said applied signal to a pulse signal having its phase related to the phase of said applied signal;
   (c) comparing said two pulse signals as to phase angle to provide a signal having two logical states indicating the presence or absence of a phase difference between the derived and applied signals; and
   (d) comparing a d.c. signal having an amplitude related to the derived signal amplitude to a reference to provide a signal having two logical states indicating whether or not the derived signal is greater in amplitude than the reference.

21. A method according to claims 19 or 20, further including utilizing said logic states to provide a visual indication of no contact, contamination, vibratory contact, or actual contact between said conductive element and said workpiece.

* * * * *